G. McINTOSH.
ROAD INDICATOR FOR VEHICLES.
APPLICATION FILED MAY 31, 1912.
1,097,593.
Patented May 19, 1914.
2 SHEETS—SHEET 1.
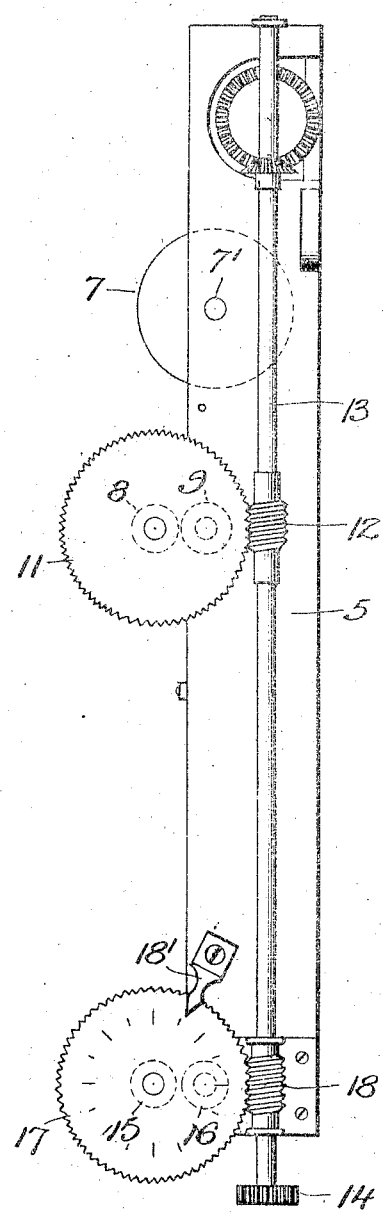
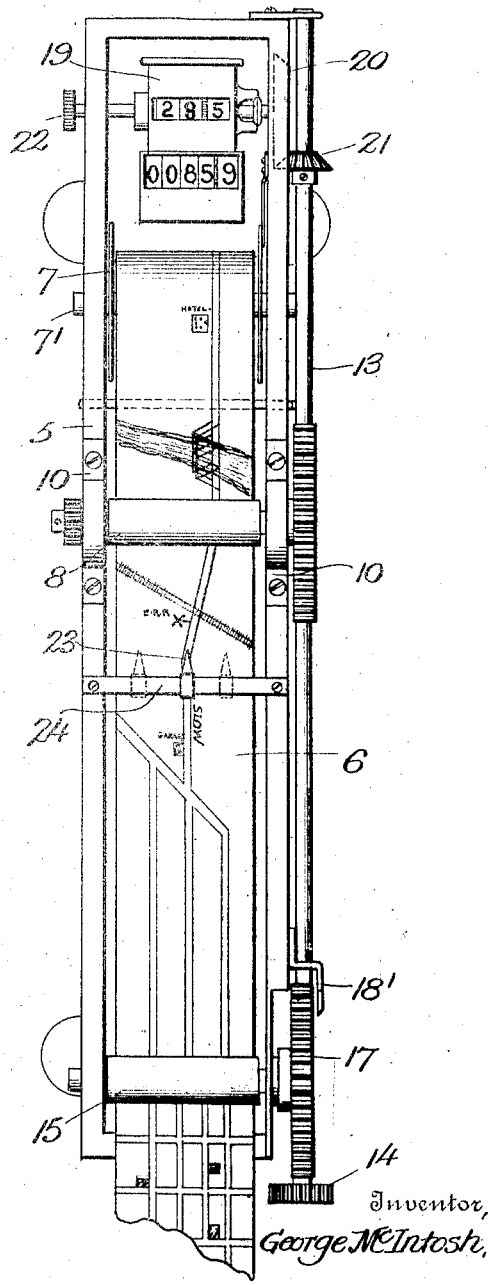

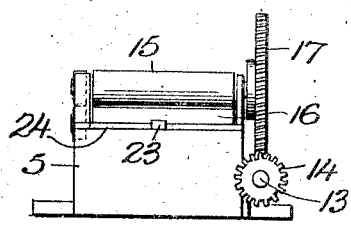
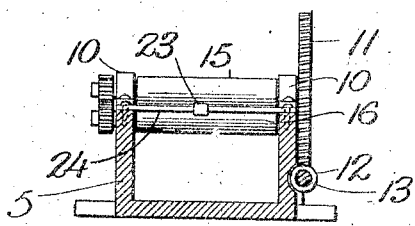
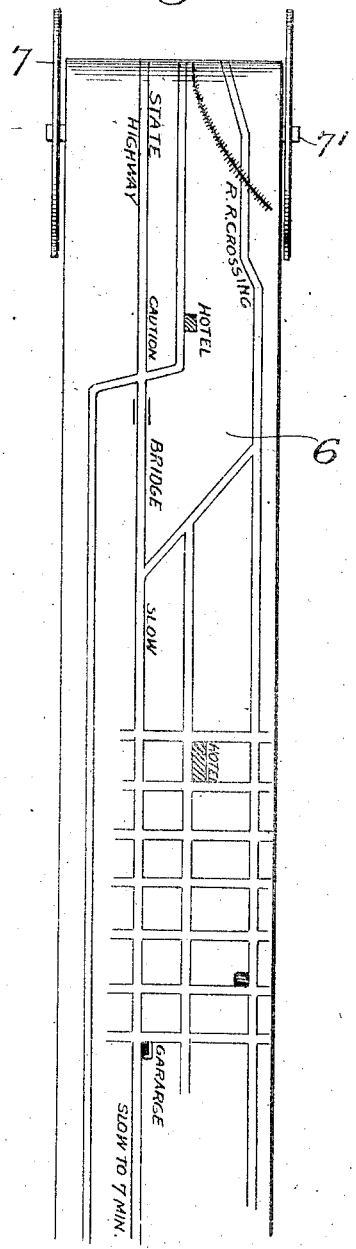

UNITED STATES PATENT OFFICE.

GEORGE McINTOSH, OF STONINGTON, CONNECTICUT.

ROAD-INDICATOR FOR VEHICLES.

1,097,593.  Specification of Letters Patent.  Patented May 19, 1914.

Application filed May 31, 1912. Serial No. 700,895.

*To all whom it may concern:*

Be it known that I, GEORGE McINTOSH, a citizen of the United States, and resident of Stonington, in the county of New London and State of Connecticut, have invented certain new and useful Improvements in Road-Indicators for Vehicles, of which the following is a specification.

This invention relates to indicators and especially to that class employed in the location of vehicles on roads and consisting of a frame carrying a map of the road which is being traversed by the vehicle and having mechanism connected with the moving parts of the vehicle for operating same and moving the map beneath a pointer which indicates the exact location of the vehicle on the map at that time. The device is also equipped with a register and indicator for exhibiting the number of miles traveled by the vehicle, as will be more fully explained in the following specification, set forth in the claims and illustrated in the drawings, wherein,—

Figure 1 is a side elevation of the device. Fig. 2 is a face view. Fig. 3 is a view of the lower end of the indicator. Fig. 4 is a cross sectional view. Fig. 5 is a view of a portion of the map removed from the device.

The indicator is arranged within a box 5, having its front end open so that the map 6 may be exposed. This map is mounted on a spool 7 and its end is passed between rollers 8 and 9 which may be covered with any flexible material and capable of adjustment by means of the screws of the bearings 10 at each side of the box. To the shaft of the outer roller 8 is secured a worm wheel 11 which is actuated by means of a worm 12 on the shaft 13 journaled on the outside of the box 5 and having at one end a gear wheel 14 which may be connected with any of the moving parts of the vehicle for the purpose of driving the means for moving the map. As will be seen in Fig. 1, the wheel 11 is geared down to quite a degree and in practice it is preferable to rotate the shaft 13 one hundred times to the rotation of the wheel 11. By this means the map is caused to move very slowly and the length of the frame and size of the map is carefully proportioned for the speed of the machine. At the lower end of the box 5 is a second set of rollers 15 and 16 driven by means of a worm wheel 17 and worm 18 similar to those above described, and driven by the same shaft 13.

An indicator 18' may be arranged on the side of the wheel 17 to denote the degree to which this wheel has been turned.

In the upper end of the box is arranged a register 19 for recording the number of miles traveled by the vehicle, and is geared with the shaft 13 by means of the beveled wheels 20 and 21. This device may have the necessary resetting knob 22 at one side.

The location of the vehicle on the map is indicated by a finger 23, arranged to be shifted along a bar 24 secured to the upper side of the box, and this finger is, in this instance, shown as pointing the location of the vehicle on the middle road of the map. If the vehicle should turn into one of the adjacent roads, this road is carried parallel with the others on the map although it may cross the original road at right angles. This arrangement of the roads is necessary in order to fit the map into the device, and the finger 23 being snugly fitted on the bar is capable of movement to indicate the position on one of the adjoining roads as shown by dotted lines in Fig. 2.

The map may be of any desired length and wound upon the spool 7. Besides the roads being indicated, prominent objects along the road may be illustrated such as, hotels, bridges, railroad crossings and any conspicuous objects which may serve to guide the occupant of the vehicle as it passes along the road.

It is necessary that the moving parts be very delicately geared in order to indicate the exact position along the road which the finger travels, and to properly locate and move the map the parts must be made in proper proportion and correspond with the movements of the mechanism of the vehicle itself.

When it is desired to place another map in the device, the shaft 7' of the spool may be slipped out after the map has been wound on the spool and if desired, the map may be placed in the device in its unwound state and the movements of the parts reversed so as to wind up the map. This reversing might also be performed in case a return trip is being made over the same road.

It is obvious that the parts may be otherwise arranged and modified without departing from the essential features above described.

What I claim as new is:—

1. In a road map indicator the combination with a frame, a map having roads indicated in parallel lines and carried by the frame, rollers adapted to move the map, gearing connecting the rollers with the moving parts of the vehicle, and a finger adapted to be set to locate the location of the vehicle on a road.

2. In a road indicator, the combination with a rectangular case to be attached to a vehicle, of a spool adapted to carry a tape map with roads arranged along the length of same and loosely journaled in the case, unwinding rollers to engage the tape map and draw it from the spool, means connected with the vehicle for driving the rollers and a pointer to be set at any road on the map.

Signed at New York in the county of New York and State of New York this 22d day of May A. D. 1912.

GEORGE McINTOSH.

Witnesses:
CHARLES LA RUE,
JAMES F. DUHAMEL.